Patented Sept. 29, 1936

2,055,496

UNITED STATES PATENT OFFICE 2,055,496

TREATMENT OF GAS

Dean D. Huffman, Vaughnsville, Ohio, and Walter L. Shively, East Orange, N. J., assignors to The Koppers Company of Delaware, a corporation of Delaware No Drawing. Application July 18, 1931, Serial No. 551,788

1 Claim. (Cl. 23—3)

This invention relates to the treatment of gas containing gum-forming compounds, and especially to the treatment of fuel gases such as coal gas, coke oven gas, and the like to prevent the deposition of gums or resins therefrom during transmission, distribution, or utilization of such gases.

An object of our invention is to provide an improved process of preventing the deposition of gums from gases containing gum-forming compounds.

A second object of our invention is to provide a process of removing gum-forming compounds from fuel gases and the like prior to the distribution of such gases.

Our invention has for further objects such other operative advantages and results as are found to obtain in the process described and claimed herewith.

It is known that in the manufacture of gas, especially in the manufacture of fuel gases by pyrolytic decomposition of coal or other bituminous materials in coke ovens, retorts and the like, small amounts of many unsaturated carbon compounds are produced. It has been found that certain of these unsaturates tend to cause trouble during the subsequent distribution and utilization of the gas.

The troublesome compounds are in general highly reactive and undergo spontaneous changes under the conditions prevailing during gas distribution. For example, olefines and other unsaturated compounds may polymerize or combine with traces of oxygen in the gas to form compounds of higher molecular weight and substantially lower vapor pressure. Due to their lower vapor pressure, these reaction products tend to condense and precipitate from the gas and thereby produce a mist or fog which is usually characterized by extremely small particle size.

Because of the small size of the individual particles the mists or dispersions formed thereby are extremely stable and persistent, and are carried by the gas for long distances. However, the particles are of a sticky or tacky nature and when the flow of gas is subjected to a sudden change of direction some of the particles are deposited on the surfaces against which the gas impinges. There they accumulate into gummy or resinous deposits. These deposits are particularly troublesome in house governors and in domestic appliances which are provided with small pilot flames or thermostat controls in which the gas flows through small or narrow orifices or passages, as such devices are soon rendered inoperative by the accumulated deposits of gums and resins.

The constituents of fuel gas which are subject to polymerization, oxidation, etc. into compounds which form the gummy dispersions referred to hereinabove are known as gum formers or gum-forming compounds. It is believed that the diolefines are particularly troublesome in this respect and that both the conjugated or straight chain diolefine compounds, such as butadiene and its homologues, and the cyclic compounds, such as cyclopentadiene, for example, are among the principal sources of gum trouble in gas distribution.

We have found that the polymerization or oxidation of gum-forming compounds which takes place slowly but continuously during the distribution of gas can be caused to occur with rapidity before the gas leaves the manufacturing plant and enters the distributing system. Furthermore, we have found that the polymerized or oxidized gum formers can be very readily removed from the gas by a simple scrubbing operation because of their relatively low vapor pressure.

It is known that many of the unsaturates, including the gum formers originally contained in the gas, can be removed by scrubbing the gas with suitable solvents such as certain petroleum fractions, but it is also known that such removal requires large volumes of fresh oil such as 15 to 20 gallons or more per 1,000 cubic feet of gas, for example. This large amount of oil is required because of the high vapor pressure of the gum formers in their original state and because substantially complete removal must be effected if the gum forming tendency of the gas is to be eliminated.

By polymerization or analogus treatment prior to scrubbing the gas, however, as is contemplated in our present invention, the gum formers are converted to compounds having vapor pressures so definitely lower that only very small quantities of fresh solvent are required for their removal. For example, we have found that 16 gallons of fresh oil per 1,000 cubic feet of untreated gas were necessary for substantially complete removal of gum formers, but that after polymerizing the gum formers according to the process of our present invention only 0.05 gallon of fresh oil per M cubic feet were required to obtain a corresponding freedom from gum troubles.

It is to be understood that the terms "polymerization", "polymerizing", etc., as used hereinbelow are intended to include polymerization in the strict technical sense, and also analogous phenomena resulting in the conversion of gum-forming compounds to compounds having materially lower vapor pressures.

We have found that the desired polymerization can be effected by passing gas containing gum formers through beds of adsorbent material such as activated charcoal, silica gel, special forms of aluminum oxide, fuller's earth, and the like, which are preferably maintained at temperatures appreciably above atmospheric. We prefer to carry out this treatment at as low a temperature as possible for economic reasons, but we have found that in general temperatures from 100° to 300° C. are suitable and practical.

We have also found that in addition to the materials previously referred to granular masses containing nickel, or other catalysts for hydrogenation, such as catalysts described in the copending application H. G. Mureck, Serial No. 539,621, filed May 23, 1931, for example, can be effectively used for inducing the polymerization of gum-forming constituents.

When such materials are used for the polymerization of gum formers according to the process of our present invention no hydrogenation is involved. These catalyst masses are therefore efficient in the present process with gases containing no hydrogen or with gases containing appreciable amounts of impurities such as $H_2S$ which are known to rapidly poison these catalysts and render them inactive for hydrogenation.

After the gum formers are polymerized in the gas, they are removed by scrubbing or washing the gas with oil or some other suitable solvent. It is not usually necessary to provide a special oil scrubber for this purpose, however, since in most manufactured gas plants the gas is scrubbed with oil ordinarily for the purpose of removing naphthalene, light oils, or both.

We therefore prefer to place the polymerizing agents in the gas stream ahead of the naphthalene and/or light oil scrubbers. The apparatus is preferably provided with suitable heat exchangers so that the gas may be heated to the desired temperature in part at least by the gas leaving the polymerizing stage.

When the gas to be treated is compressed prior to transmission or distribution, we prefer to employ the polymerizing and scrubbing process after the compressors in order to utilize the heat of compression of the gas for maintaining the desired temperature and also to take advantage of the favorable effect of pressure on polymerization of the gum formers. In this case the gas is freed from polymerized gum formers by passing it through a small pressure oil scrubber such as a bubble chamber located after the compressor and the polymerizing stage. This special scrubber is fed with the required quantity of fresh oil as before.

The broad principle of the present invention can be applied in a variety of ways. For example, we may scrub the untreated gas with oil to remove the gum formers as described in a copending application of D. L. Jacobson and W. L. Shively, Serial No. 482,990, filed September 19, 1930, now Patent No. 1,932,525, or otherwise, and continuously regenerate the oil for the further absorption of gum formers by passing the oil through suitable beds of polymerizing agents, such as those we have described hereinabove for the direct treatment of the gas.

Substantially the same temperatures are maintained in treating the oil as in treating the gas. This modification has great advantages in certain cases since the volume of oil to be treated is much smaller than the corresponding gas volume and consequently the size of the equipment and the thermal requirements are substantially reduced.

When the oil is to be treated for polymerization of gum-forming compounds contained therein, the polymerizing agents or beds may be impregnated with materials which accelerate polymerization of the gum-forming compounds, such as $SnCl_4$, $AlCl_3$, $SCl_2$, $H_2SO_4$, $HCl$, $SO_2$ etc., or we may add such materials, or solutions of these materials in suitable solvents, directly to the oil. The process constituting our present invention may be carried on in an economical and simple manner and without adverse effect on other valuable constituents of the gas.

It will be obvious to those skilled in the art that various modifications can be made in the several steps of our process without departing from the spirit of our invention and it is our intention to cover in the claim such modifications as are included within the scope thereof.

We claim as our invention:

A method of preventing deposition of gums in the distribution of fuel gas of the character produced by pyrolytic decomposition of coal or other bituminous material and which prior to purification contains gum-forming compounds tending to react and undergo spontaneous changes under conditions prevailing in the gas distribution systems, which comprises scrubbing said fuel gas prior to distribution with oil to absorb said gum-forming compounds, treating the spent oil with a polymerizing agent of solid material selected from the group of solid adsorbents consisting of activated charcoal, fuller's earth, silica gel and alumina which has incorporated therein a polymerization accelerator from the group consisting of $SnCl_4$, $AlCl_3$, $SCl_2$, $H_2SO_4$, $HCl$, and $SO_2$, returning the regenerated oil for further scrubbing, and delivering the gas free from the so reacted compounds into the distribution system.

DEAN D. HUFFMAN.
WALTER L. SHIVELY.